US007323613B2

(12) United States Patent
Vladimirov

(10) Patent No.: US 7,323,613 B2
(45) Date of Patent: Jan. 29, 2008

(54) METHOD AND INSTALLATION FOR THE TREATMENT OF RADIOACTIVE WASTES

(76) Inventor: Vladimir Asenov Vladimirov, No. 6, N. Voivodov Street, Entrance B. Apt. 20, 3000 Vratsa, Vratsa (BG)

( * ) Notice: Subject to any disclaimer, the term of this patent is extended or adjusted under 35 U.S.C. 154(b) by 308 days.

(21) Appl. No.: 10/494,596

(22) PCT Filed: Nov. 4, 2002

(86) PCT No.: PCT/BG02/00027

§ 371 (c)(1),
(2), (4) Date: May 5, 2004

(87) PCT Pub. No.: WO03/041088

PCT Pub. Date: May 15, 2003

(65) Prior Publication Data

US 2004/0254417 A1 Dec. 16, 2004

(30) Foreign Application Priority Data

Nov. 9, 2001 (BG) ..................................... 106097

(51) Int. Cl.
*G21F 9/06* (2006.01)
*G21F 9/20* (2006.01)
*G21C 1/00* (2006.01)
*B01D 61/42* (2006.01)

(52) U.S. Cl. ................. 588/20; 588/2; 588/3; 204/518; 422/159

(58) Field of Classification Search .................. 588/20, 588/12, 1, 18, 2, 3; 422/159; 204/518
See application file for complete search history.

(56) References Cited

U.S. PATENT DOCUMENTS 4,595,528 A * 6/1986 Greenhalgh .................. 588/12
4,793,947 A * 12/1988 Izumida et al. ................ 588/3
4,800,042 A * 1/1989 Kurumada et al. ............ 588/3
5,096,624 A 3/1992 Dorr et al.
6,448,461 B1 * 9/2002 Toyohara et al. ............. 588/12

FOREIGN PATENT DOCUMENTS

| | | |
|---|---|---|
| BG | 51265 A | 3/1993 |
| GB | 2163892 A | 3/1986 |
| JP | 59-12400 | 1/1984 |

* cited by examiner

*Primary Examiner*—Wayne A. Langel
*Assistant Examiner*—James Fiorito
(74) *Attorney, Agent, or Firm*—Charles E. Bruzga; Bruzga & Associates

(57) ABSTRACT

The invention relates to a method and system for the treatment of radioactive wastes produced as a consequence of the operation of nuclear power plants with pressurized water reactors and boron reactivity regulation accompanied by the simultaneous production of environmentally acceptable substances of, for example, borax, calcium-magnesium borates, boron acid and sodium hydroxide solutions.

As a result of the radioactive waste treatment method and system according to the invention, the following products are obtained: borax with an environmentally acceptable content of radioactive isotopes that contain only the cesium isotopes with a maximum total concentration of 800 Bq in one kilogram of borax; calcium, magnesium and/or calcium-magnesium borates with an environmentally acceptable content of radioactive isotopes; boron acid solution with an environmentally acceptable content of radioactive isotopes; sodium hydroxide solution containing only the cesium isotopes with a maximum total concentration of 800 Bq in one kilogram of sodium hydroxide; and radioactive waste containing under 5 g/l of boron acid.

11 Claims, 1 Drawing Sheet

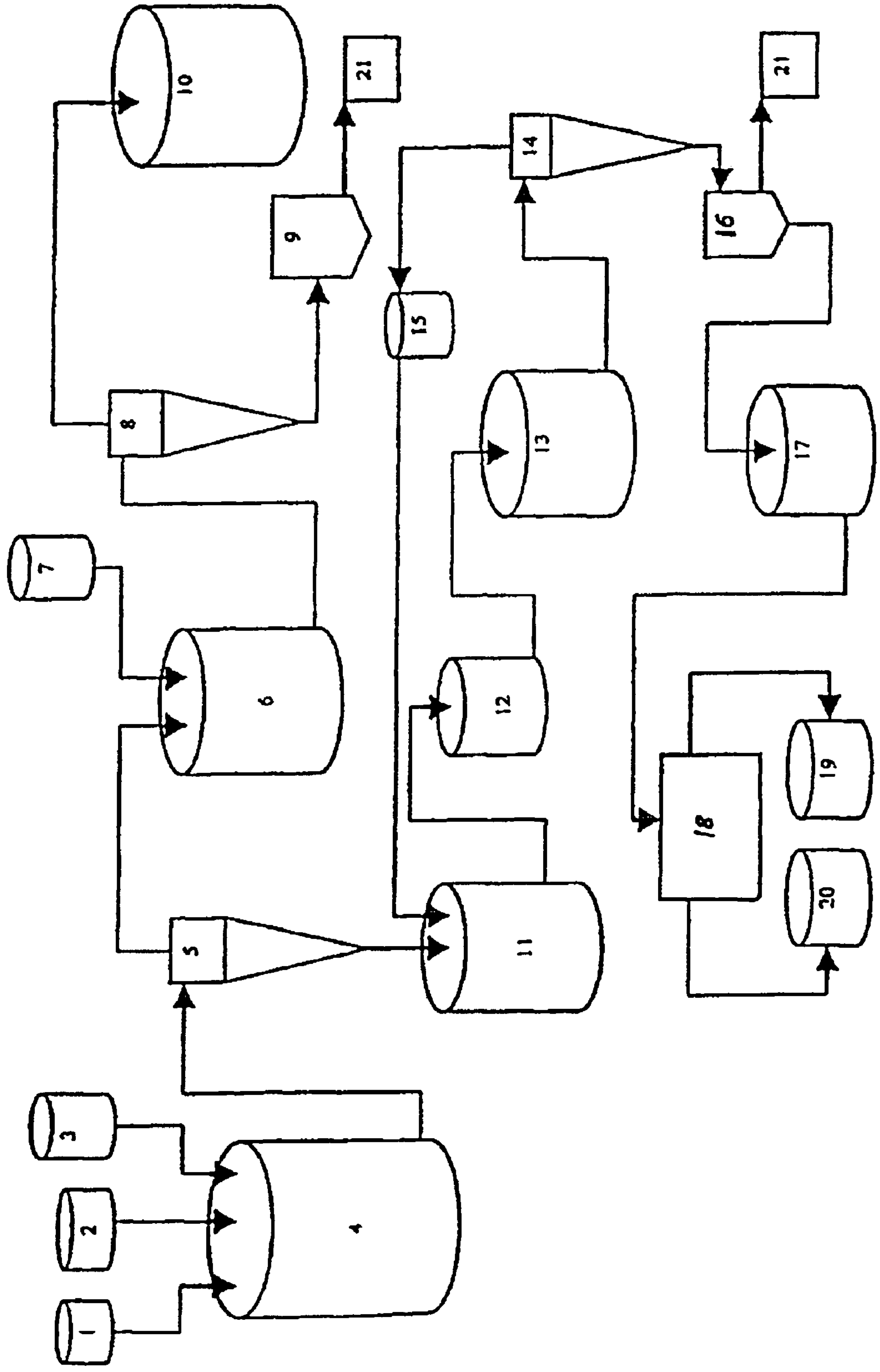
1
2
3
4
5
6
7
8
9
10
11
12
13
14
15
16
17
18
19
20
21
21

METHOD AND INSTALLATION FOR THE TREATMENT OF RADIOACTIVE WASTES

TECHNICAL AREA

The present invention relates to a method and an installation for the treatment of radioactive wastes resulting from the operation of nuclear power plants with reactors that have water under pressure using boron reactivity regulation and destined for the yielding of products like borax, calcium-magnesium borates, boron acid and sodium hydroxide solutions with an allowed content of radioactive isotopes suitable for multiple use and for comprehensive environmental protection.

BACKGROUND OF THE INVENTION

It is a known method for the treatment of radioactive waste water (BG 60569) that is first concentrated to an almost dry salt and thereafter treated with alcohols with longer carbon chains. At the treatment of boron acid-containing salts with alcohols, an esterification of the boron acid and alcohol begins. The ester so obtained is treated by a high temperature (above 100° C.) distillation until boron acid is produced.

The main shortcoming of this method is that all the processes are running at high temperatures, using longer carbon chain alcohols and applying ester distillation of boron acid with large heat energy consumption. Basically this process is very complicated and much labor force consuming.

It is also a known method (BG 51265A) for the treatment of radioactive wastes until boron acid salt —$Na_2B_4O_7$ (borax) containing radionuclides of an environmentally allowed concentration is obtained. The method consists of several stages—concentration of radioactive wastes with different indicators of pH—lower than 4.5 and higher than 8.5, and thereafter mixing the concentrates. Under an appropriate temperature regime, the radioactive waste containing boron acid of a concentration of 15-20 g/l and the borax in an environmentally admissible radioactive isotope concentration, are produced, which is non-radioactive waste. By a suitable technology from the non-radioactive salt—borax, a boron acid solution can be obtained.

An installation additionally presented to this method is for radioactive waste treatment, which includes a reservoir for radioactive wastes with pH lower than 4.5, a reservoir for radioactive wastes with pH higher than 8.5, a reservoir with radioactive wastes with pH between 4.5 and 8.5, evaporators, mixer for the concentrates with different pH, reservoir for correcting additives, crystallizer for borax, filter with adsorbent, reservoir for the concentrated lye, and reservoir for non-radioactive boron acid.

A shortcoming of this method and the used installation is to keep the content of 15-20 g/l non-radioactive boron acid in the radioactive waste subject to further long-term storage. The remaining radioactive waste contains non-radioactive boron acid, which takes up large capacities in the radioactive waste storage facilities, reduces the cement matrix strengths and filling up with salts is decreased; and also allows radioactive isotopes, washing away from the matrix in case of radioactive waste cementation method application. Thus there is a continuing negative effect on the safety during the interment accompanied by an increase of the costs of treatment and the interment.

The known methods for treatment of the liquid radioactive wastes from this background, are directed predominately to the neutralization of the negative effect of the boron acid on the immobilized product, especially during cementing, and there are no other non-radioactive products except water to be separated.

SUMMARY OF THE INVENTION

An object of the present invention is to establish a method and an installation for the treatment of liquid radioactive wastes, permitting of the preparation of the radioactive wastes for a long-term storage with a minimum non-radioactive boron acid in a form of non-dissolvement and non-reaction with the cement matrix chemical compound, and for obtaining environmentally harmless materials appropriate for industrial use.

The solution of this problem can be found through a method, by which after separating and collecting the acid and alkali radioactive wastes, their concentration is realized. The radioactive wastes with pH above 5.5 are treated until reaching a concentrated solution of alkali metaborates ($NaBO_2$,$KBO_2$) with a mol ratio of Na/B equal to 1 and a concentration of boron acid (boron salts) from 35 to 200 g/l. The radioactive wastes with pH lower than 5.5, free of boron acid, are concentrated until reaching the total salts content of 400 to 500 g/l. Thus the concentrated solutions are mixed. The mixed concentrate is in the form of fine sediment (middling slime) containing radioactive isotopes of cobalt, iron, manganese, strontium, etc. After the correction with nitric acid for obtaining the sodium tetraborate $Na_2B_4O_7$ at the temperature of 10-35° C., remaining in the solution is 20-25 g/l of the sodium tetraborate and crystals of borax with a size under 0.5 mm; the rest of the sodium tetraborate is separated in crystals bigger than 0.5 mm. The correction with nitric acid is realized until reaching a mol ratio Na/B from 0.5 to 0.6. This ratio results in reaching a pH from 8 to 10.1 of the mixed solution. If an additional correction of the pH is necessary, correction additives can be used, for instance nitric acid or other mineral acid, sodium carbonate or sodium hydroxide. After the crystals of sodium tetraborate are separated, there remain in the solution the sediment and the rest of all the other radio nuclides. The crystals of sodium tetraborate which are obtained with a size of more than 0.5 mm, are filtered, washed up, re-crystallized and separated as crystal radioactive pure and safe tetraborate. A part of the pre-crystallized sodium tetraborate is for packaging and the other part is the subject of the solution which is treated through electrodialysis until pure products for the industry are obtained—they are solutions of the boron acid with concentration of 0.1 to 60 g/l, and sodium hydroxide with a concentration of up to 150 g/l. The electrodialysis centre works by using temperature resistant cationic and anionic membranes and electrical power with a voltage from 0.5 to 55 V and a power of electricity from 0.2 to 45 A.

Salts of alkaline-earth metals (especially calcium and magnesium salts) are added to the separated solution with a concentration of 20-25 g/l sodium tetraborate, whose crystal phase has a size under 0.5 mm, until reaching a mol ratio of Ca(Mg)B from 0.25 to 0.35. As a result of the reaction, there is separated a mixture of calcium-manganese hexaborate and calcium-manganese tetraborate, the predominant quantity being hexaborate. Thus the radioactive isotopes of the cesium remain in the solution and define only the superficial pollution of the separated alkaline-earth borates as crystals, which are removed by washing up. The boron salts, which remain in the radioactive waste and are subsequently the subject of immobilization, are in the range of 2 to 4 g/l as calcium-manganese salt.

During the application of the method according to the invention, there are separated non-radioactive products—boron salts, boron acid, and sodium hydroxide, which do not require measures for neutralization of the damaging effects of the boron acid contained in the treated liquid radioactive wastes, as long as the boron acid is led out of the process as being non-radioactive. As a result, in the radioactive waste which is the subject of subsequent immobilization and interment, there remains 2-4 g/l calcium-manganese hexaborate, which has no harmful effect on the immobilization through cementing.

As salts of alkaline-earth metals, calcium and manganese salts or mixtures of them, can be used.

The method according to the invention is realized with an installation for the treatment of the radioactive wastes.

The installation includes reactor-homogenizer 4, fed by reservoir 1 for radioactive wastes with pH under 5.5 connected to reactor-homogenizer 4 and reservoir 2 for radioactive wastes with pH above 5.5, as well as reservoir 3 for pH correction additives.

The reactor-homogenizer 4 is also connected with the separator 5 for separation of crystal borax phase and liquid radioactive waste containing 20-25 g/l boron acid.

The liquid radioactive waste runs to a mixer-settling tank 6 that is connected in its upper part with a reservoir 7 for feeding with alkaline-earth metals salt solutions and in its lower part with separator 8 for separation of alkaline-earth borates. From the separator 8 the crystal phase of these alkaline-earth borates (mixtures of calcium-manganese tetraborate and calcium-manganese hexaborate) are subject to rectification in separator 9 and after that feeds the packing unit 21 and the liquid radioactive waste containing 2-4 g/l boron salts feeds the reservoir 10 for treated radioactive waste.

The other product outgoing from separator 5—the crystal phase of borax with size of over than 0.5 mm is fed and dissolved in a buffer reservoir 11 for solution of borax, passes through filter 12 and is transported to reactor-crystallizer 13 and separator 14 for re-crystallized borax, from which the re-crystallized borax feeds the separator 16 and the solution-filtrate is collected in a reservoir 15 and is returned into the interim buffer reservoir 11 for borax solution.

A part of the re-crystallized borax from separator 16 feeds the packing unit 21 and the other part feeds the reservoir 17 for dissolving once again, and after that, feeds the electrodialysis center 18 from which the obtained solutions of boron acid and sodium hydroxide are fed to the reservoir for boron acid 19 and the reservoir for the sodium hydroxide 20.

The advantages of this method and the installation for radioactive waste treatment according to the present invention consist of the following:

1. Suitable to use products are obtained from the radioactive wastes with an environmentally allowed content of radioactive isotopes. The substances obtained through the method according to the invention are:

- Borax with an environmentally allowed content of radioactive isotopes including only cesium isotopes with maximum total concentration of 800 Bq per kilogram borax;
- Calcium, magnesium or calcium-magnesium borates with environmentally allowed content of radioactive isotopes;
- Boron acid solution with an environmentally allowed content of radioactive isotopes;
- Sodium hydroxide solution containing only the isotopes of cesium in a maximum total concentration of 800 Bq per kilogram sodium hydroxide.
- Radioactive waste containing under 4 g/l boron acid (boron salts)

2. The radioactive waste obtained as a result of the method according to the present invention contains very small quantities of boron acid, e.g. it does not take large spaces in the radioactive waste storage area with non-radioactive products.

BRIEF DESCRIPTION OF THE DRAWING

The FIGURE shows a flow diagram for the treatment of acid- and alkali-containing liquid radioactive wastes resulting from the operation of a nuclear power plant.

The present invention is explained by the attached technical scheme of the installation for the treatment of a radioactive waste resulting from the operation of nuclear power plants—the Figure

THE FIGURE EXPLANATION SHEET

The installation consists of the following equipment:

1—reservoir for radioactive wastes with pH under 5.5
2—reservoir for radioactive wastes with pH above 5.5
3—reservoir for correctional additives for pH adjustment
4—reactor—homogenizer
5—borax crystal phase and liquid radioactive waste separator
6—mixer—settling tank
7—reservoir for solutions of alkaline-earth metals salts
8—borate (calcium and magnesium) separator
9—separator
10—reservoir for treated radioactive wastes with a boron salts concentration of about 2-4 g/l.
11—buffer reservoir for borax solution
12—filter
13—reactor—crystallizer
14—re-crystallized borax separator
15—interim reservoir
16—borax separator
17—reservoir for dissolving of re-crystallized borax
18—electrodialysis centre
19—boron acid solution reservoir
20—sodium hydroxide solution reservoir
21—packing unit The installation operates as follows:

The radioactive wastes with pH under 5.5 from the reservoir 1 not containing boron acid are concentrated until reaching a total salts content of 400 g/l up to 500 g/l. Radioactive waste with pH above 5.5 from the reservoir 2 are treated to a concentrated solution of alkaline metaborates ($NaBO_2$, $KBO_2$) which has a mol ratio of Na/B equal to 1 and a concentration from 35 to 200 g/l. The concentrated solutions from the reservoir 1 and reservoir 2 are fed together with correction additives to regulate the pH of the reservoir 3 and are mixed in reactor-homogenizer 4 at a temperature of 10-35° C. to obtain sodium tetraborate (borax). If it is necessary for an additional correction of the pH correction additives are used, for instance nitric or other mineral acid, sodium carbonate or sodium hydroxide. The correction runs until reaching the mol ratio Na/B from 0.5 to 0.6; and afterward the reaction mixture is fed to separator 5. As a result of this reaction, 20-25 g/l sodium tetraborate remain in the solution and the rest of the tetraborate is crystallized. The borax crystal phase having a particle size more than 0.5 mm is transferred to buffer reservoir 11, and the borax crystal phase having a particle size under 0.5 mm, together with the radioactive waste from separator 5, is transferred to the mixer-settling tank 6. A reservoir 7 for solutions of alkaline-earth metal salts, especially calcium salts and/or manganese salts and/or mixtures thereof, is connected to the mixer-settling tank 6. These solutions are transferred to the mixer-settling tank 6 until reaching a mol ratio of Ca(Mg)/B from 0.25 to 0.35. As a result of the reaction, a mixture of calcium-manganese hexaborate and calcium-manganese tetraborate is separated with the predominant quantity being hexaborate. The mixer-settling tank 6 is connected to the separator for alkaline-earth borates 8, from which the alkaline-earth borate crystal phase is transferred for purification in the separator 9, which is connected to the packing unit for alkaline-earth borates 21. The liquid waste from the separator 8 with a salts content of 2-4 g/l boron salts is fed to the reservoir for already treated radioactive wastes 10.

The borax crystallized phase fed to the buffer reservoir 11 with a size of more than 0.5 mm is dissolved, the solution is filtered in the filter 12 and is transported to the reactor-crystallizer 13 where the borates are re-crystallized. Afterwards the mixture is transferred to the separator for re-crystallized borax 14, then the re-crystallized borates are fed to the separator 16 and the solution is led to the interim reservoir 15 and afterwards is returned to the buffer reservoir 11. A part of the re-crystallized borates from the separator 16 are fed to the packing unit for re-crystallized borax 21 and the other part is transferred to be dissolved in reservoir 17 together with the solution from the reactor-crystallizer 13. The dissolved borates from reservoir 17 are fed to the electrodialysis center 18 where as a result from the electrodialysis there is obtained a solution of boron acid with a concentration from 0.1 to 60 g/l, which is transferred to the reservoir 19, and a solution of sodium hydroxide with a concentration of up to 150 g/l, which is transferred to the reservoir 20.

EXAMPLES FOR IMPLEMENTATION OF THE INVENTION

Example 1

A litter radioactive waste with pH 8.0 containing 35 g/l boron acid (boron salts) is mixed with radioactive waste with pH 10.1 with mol ratio Na/B=0.5, containing 150 g/l boron salts ($NaBO_2$) until the mixture reaches a pH of 9.1.

$$H_3BO_3+NaBO_2\rightarrow Na_2B_4O_7$$

Sodium tetraborate is obtained, which maintains 20-25 g/l concentration in the solution. The remaining quantities over that concentration of borax are separated as crystals with a size of more than 0.5 mm. The mol ratio is maintained at Na/B=0.5 during the running of this process.

After the separation of the borax as a crystal mass, 9.0 ml solution of calcium nitrate with a concentration of 900 g/l is added to the rest of the liquid radioactive waste until reaching the mol ratio of Ca/B=0.25 to 0.35.

$$Na_2B_4O_7+Ca(NO_3)_2\rightarrow Ca_2B_6O_{11}$$

The separated calcium hexaborate is subjected to multiple washings with water and is separated as non-radioactive product. The liquid waste, after the separation of the calcium hexaborate and water from the washing of the hexaborate crystals, are subjected to concentration until reaching a concentration of the hexaborate of 3 g/l.

From the separated borax, a solution is prepared with a concentration of 20 g/l which is subject to electrodialysis. In the electrodialysis centre, heat-resistant cation-exchanging and anion-exchanging membranes are used and also electricity with voltage 5.2 V and power of electricity 0.35 A. The obtained products are: boron acid solution in a concentration of 10 g/l and sodium hydroxide solution in a concentration of 1.5 g/l.

Example 2

One liter of radioactive waste with a pH of 10.0 with mol ratio Na/B=1 containing 200 g/l boron acid (boron salts $NaBO_2$) is mixed with radioactive waste with pH of 4.0 until the mixture reaches a pH of 9.1.

$$HNO_3+NaBO_2\rightarrow Na_2B_4O_7$$

Sodium tetraborate is obtained, which maintains 20-25 g/l concentration in the solution. The rest over than this concentration borax quantities are separated as crystals with a size of more than 0.5 mm. This process runs at a constant mol ratio of Na/B=0.6.

After borax separation as a hard crystal phase to residual liquid radioactive waste, 9.4 milliliters of magnesium-chloride solution with a concentration of 500 g/l. is added until reaching a mole ratio of Mg/B=0.25 to 0.35.

$$Na_2B_4O_7+MgCl_2\rightarrow Mg_2B_6O_{11}$$

During mixing with magnesium oxide or magnesium hydroxide is separated at the same time with the separation of the hardly dissolving magnesium hexaborate and sodium hydroxide, which could be used for the initial correction of the pH of the radioactive waste.

$$Na_2B_4O_7+Mg(OH)_2\rightarrow Mg_2B_6O_{11}+NaOH$$

The separated borax is the subject of multiple washings with water and is separated as non-radioactive product.

The remaining liquid waste after the separation of the magnesium hexaborate and the water after washing are subject to concentration until reaching a hexaborate concentration of 4 g/l.

From the separated borax after re-crystallization is prepared a solution with a concentration of 25 g/l which is treated by electrodialysis. In the electrodialysis centre, heat-resistant cation-exchanging and anion-exchanging membranes are used and also a electricity with a voltage of 55 V and power of electricity of 45 A. Solutions of boron acid in a concentration of 59 g/l and sodium hydroxide solution in a concentration of 150 g/l are obtained.

The invention claimed is:

1. A method for the treatment of acid- and alkali-containing liquid radioactive wastes resulting from the operation of a nuclear power plant utilizing a pressurized water reactor with boron reactivity regulation, comprising the steps of:

(A) separately collecting the liquid radioactive wastes as (i) acidic wastes having a pH of less than 5.5 and free of boron acid, and (ii) as alkali wastes having a pH greater than 5.5 and containing boron salts;

(B) thereafter separately concentrating the liquid acidic radioactive wastes until it reaches a total salt content of 400 to 500 grams/liter;

(C) separately concentrating the liquid alkali radioactive wastes, which comprise boron salts inclusive of the alkali metaborates of $NaBO_2$ and $KBO_2$, until reaching a concentration wherein the alkali metaborates contained therein have a mol ratio of Na/B equal to 1, and the boron salts reach a concentration from 35 to 200 grams/liter;

(D) mixing the concentrated radio active waste solutions of steps (B) and (C) in a reactor vessel and treating the reaction mixture at a temperature range of 10 to 35° C. with a correction additive of nitric acid for providing a pH of the mixture in the range of 8.0-10.1, and optionally adding a mineral salt for adjusting, if necessary, and maintaining the pH of the reaction mixture at 8.0-10.1; until crystallized sodium tetraborate and a sodium tetraborate solution is obtained having a mol ratio of Na/B from 0.5 to 0.6 and whose concentration is 20-25 grams/liter;

(E) separating crystallized sodium tetraborate having a particle size greater than 0.5 mm from the remaining radioactive 20-25 grams/liter of sodium tetraborate solution of step D which comprises sodium tetraborate crystals having a particle size less than 0.5 mm;

(F) transferring the radioactive solution of step (E) to a mixing-settling vessel wherein the radioactive sodium tetraborate solution is treated with alkali metal salts of calcium and manganese to produce an environmentally acceptable radioactive reaction solution of calcium-manganese hexaborate and calcium-manganese tetraborate crystals having a mol ratio of Ca/Mg to B in the range of 0.25 to 0.35;

(G) separating the calcium-magnesium hexaborate and calcium-magnesium tetraborate crystals from the environmentally acceptable radioactive reaction solution of step (F) by filtering, subsequent washing, and drying for eventual packaging, whereby the remaining boron salt solution has a concentration of 2-4 grams/liter thereby rendering it suitable for immobilization by cementation;

(H) subjecting the sodium tetraborate crystals having a particle size greater than 0.5 mm obtained in step (E) to aqueous washing and filtration, and subsequent re-crystallization to produce a non-radioactive, re-crystallized sodium tetraborate product; and (I) subjecting all or a portion of the re-crystallized sodium tetraborate product of step (H) to aqueous dissolution and thereafter submitting the borate solution to electrodialysis for producing a boron acid solution and a sodium hydroxide solution.

2. The method according to claim 1 wherein the mineral salt of step (D) is sodium hydroxide or sodium carbonate.

3. The method according to claim 1 wherein the presence of the calcium-manganese hexaborate in step (F) is greater than the calcium-manganese tetraborate.

4. The method according to claim 1 wherein the concentration of the boron acid solution is from 0.1 to 60 grams/liter.

5. The method according to claim 1 wherein the sodium hydroxide solution has a concentration of up to 150 grams/liter.

6. The method according to claim 1 wherein the electrodialysis of the borate solution is implemented by using heat-resistant membranes.

7. The method according to claim 1 wherein the electrodialysis of the borate solution is carried out with a current of 0.2 to 45 amperes and a voltage from 5.0 to 55 volts.

8. A system for the treatment of acid- and alkali-containing liquid radioactive wastes resulting from the operation of a nuclear power plant utilizing a pressurized water reactor with boron reactivity regulation, comprising (a) a reactor-homogenizer 4 connected to a reservoir 1 containing radioactive wastes with a pH under 5.5, a reservoir 2 containing radioactive wastes with a pH above 5.5, and a reservoir 3 for containing pH correction additives;

(b) a separator (5) for the separation of crystalline sodium tetraborate from sodium tetraborate-containing liquid radioactive waste, both of which are formed in reactor-homogenizer (4);

(c) a mixer-settling tank (6) whose upper portion receives the liquid radioactive waste from separator (5) and the feeding of an alkaline-earth metal salt solution from a reservoir (7), and whose lower portion is connected to borate separator (8) to which the reaction product of crystalline alkaline earth borates formed in said mixer-settling tank (6) is transported for refining in a separator (9) and packaged in a packing unit (21);

(d) a reservoir (10) connected to borate separator (8) for receiving therefrom liquid radioactive waste in the form of boron salts for further treatment of the same;

(e) a reservoir (11) for receiving and dissolving the crystalline sodium tetraborate from separator (5);

(f) a filter apparatus (12) disposed between and connected to reservoir (11) and a reactor container (13) for filtering and re-crystallizing, respectively, the sodium tetraborate from reservoir (11);

(g) a separator (14) for receiving the re-crystallized boron salt and associated filtrate from reactor container (13), and for recycling the filtrate to said reservoir (11), said separator (14) being connected to a separator apparatus (16) that feeds a portion of the re-crystallized sodium tetraborate to a packaging unit (21) and to a reservoir (17) for aqueous dissolution of said re-crystallized sodium tetraborate; and (h) an electrodialysis apparatus (18) connected to reservoir (17) for receiving the re-crystallized sodium tetraborate solution therefrom, and also connected to a reservoir (19) and a reservoir (20) for respectively collecting boron acid and sodium hydroxide derived from said electroldialysis apparatus (18).

9. The system of claim 8 wherein an interim reservoir (15) is disposed between and connected to said separator (14) and said reservoir (11) for collecting said filtrate.

10. The system of claim 8 wherein said electrodialysis apparatus (18) utilizes heat-resistant cation-exchanging and heat-resistant anion-exchanging membranes.

11. The system of claim 10 wherein the electrodialysis apparatus (18) operates at a voltage range of 5.0 to 55 volts and an electrical current range of 0.2 to 45 amps.

* * * * *